E. A. WALL.
RESILIENT WHEEL.
APPLICATION FILED FEB. 25, 1911.
1,001,714.
Patented Aug. 29, 1911.
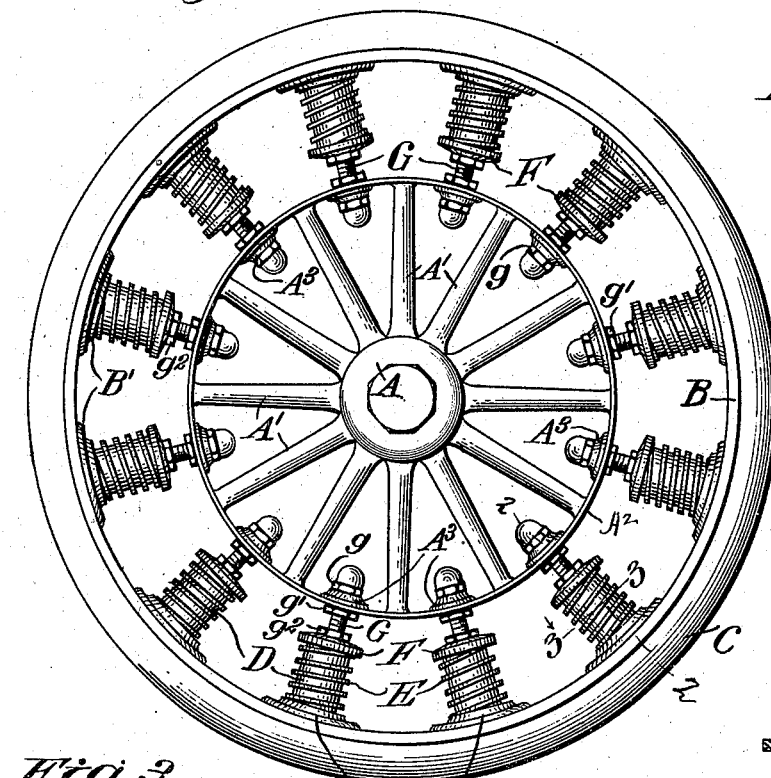
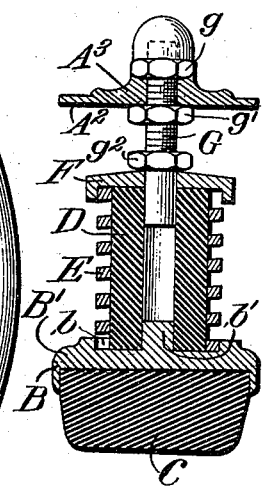
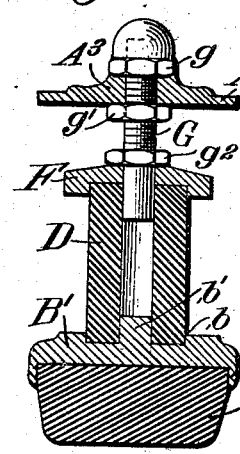
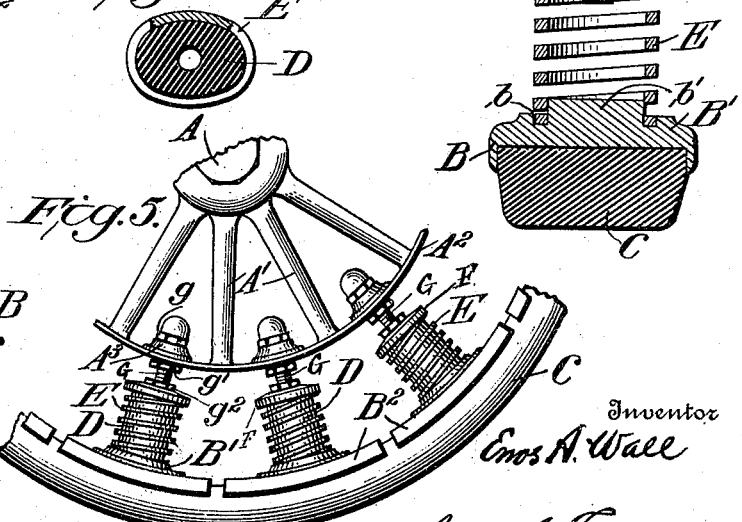

UNITED STATES PATENT OFFICE.

ENOS A. WALL, OF SALT LAKE CITY, UTAH.

RESILIENT WHEEL.

1,001,714.  Specification of Letters Patent.  Patented Aug. 29, 1911.

Application filed February 25, 1911. Serial No. 610,905.

*To all whom it may concern:*

Be it known that I, ENOS A. WALL, a citizen of the United States, residing at Salt Lake City, in the county of Salt Lake and State of Utah, have invented certain new and useful Improvements in Resilient Wheels, of which the following is a specification.

My invention relates to resilient wheels.

The object of the invention is to produce a resilient wheel which shall be simple in construction and effective in cushioning the vertical and lateral motions of the vehicle. These objects I accomplish by the construction shown in the accompanying drawings, in which—

Figure 1 is a sectional side elevation of a wheel provided with my improvements. Fig. 2 is a cross-section therethrough on line 2—2. Fig. 2$^a$ is a section on line 3—3. Fig. 3 is a sectional view showing a modified form of spring. Fig. 4 is a like view of a further modification. Fig. 5 is a side elevation of a portion of a wheel with its outer rim sectional.

A, designates the hub of any suitable construction from which radiate the spokes A′ united at their outer ends by the circular metallic band or felly A$^2$. Between the spokes A′ the band or felly is provided with raised integral bosses A$^3$ through which and the felly extend non-threaded apertures.

B, is the outer metallic rim preferably of channel form to receive a solid rubber tire C. This metallic rim B, is also provided on its inner side with raised integral bosses B′, each having a cup $b$, formed by an annular flange elliptical crosswise of the rim and in the center of which projects a stud or post $b'$.

D, are tubular rubber blocks elliptical in cross-section and seated in the elliptical cups $b$, with the studs or posts $b'$, entering the outer ends of their bores. Surrounding the rubber blocks D, are elliptical coil springs E with their outer ends also seated in the cups $b$. At the inner ends of the composite springs D, E, centrally apertured elliptical cups F, are placed.

Extending through the band or felly A$^2$ and its bosses A$^3$ are the adjusting bolts G, the outer ends of which project through the cups F into the inner ends of the bores of the blocks D. The bolts G, are clamped to the felly or band by inner and outer nuts $g$, $g'$ and the bolts are further provided next to the cups F, with a nut $g^2$. It will be seen therefore that the adjustment of the bolts G, to secure the springs D, E, in place and give them their initial compression may be effected by the nuts $g$, $g'$, and that thereafter a further adjustment of the springs may be had by simply turning nuts $g^2$; these latter nuts serving also as bearings for the cups F, and limiting their inward movement on the bolts G. A very nice adjustment of the springs may therefore be had by means of the nuts $g^2$ without the necessity of loosening the bolts G.

It will be noted that the studs or posts $b'$, and the inner ends of bolts G, are spaced apart a considerable distance to allow of the longitudinal compression of the springs by the load, and furthermore the posts and bolts are not connected within the springs by any metallic sleeves or devices other than the springs themselves so that the springs are perfectly free to yield laterally, as well as longitudinally which is essential to a perfectly working wheel. The elliptical shape of the springs transversely of the wheel is to stiffen them under such lateral or sidewise strains.

While I have shown the springs in Figs. 1 and 2 as made up of inner rubber tubes or blocks and outer helical springs they may be formed of rubber tubes or blocks D, only, as in Fig. 3, or of helical springs E, only, as in Fig. 4. The composite spring D, E, is however preferable.

Referring to Fig. 5 it will be seen that it shows the same arrangement of springs and adjusting devices, but the outer metallic rim instead of being in one continuous piece as in Fig. 1, is formed in section B$^2$ around which the outer rubber tire C passes.

What I claim is:

1. A resilient wheel comprising, a hub and its connected metallic felly provided with apertures, the outer tire-carrying rim provided on its inner side with a series of cups having central studs or posts, tubular springs seated at their outer ends in said cups with the studs entering their bores, centrally apertured cups fitting the inner ends of the springs, radial bolts extending through the felly apertures and through the apertured cups into the bores of the springs, nuts on the bolts at the inner and outer faces of the felly and a nut on every bolt against the outer face of the apertured cup; the ends of the bolts and rim-studs or posts being spaced apart and disconnected to allow the springs to yield laterally, as well as longitudinally.

2. A resilient wheel comprising, a hub and its connected felly provided with apertures, a tire carrying rim formed on its inner side with transversely arranged elliptical pockets having central studs, elliptical tubular springs seated in the pockets with the studs entering their bores, centrally apertured elliptical cups fitting on the inner ends of the springs, radial bolts extending through the felly and cup apertures into the bores of the springs, nuts clamping the bolts to the inner and outer faces of the felly and other nuts on the bolts against the apertured cups; the adjacent ends of the bolts and studs being spaced apart and wholly disconnected to allow freedom of movement to the springs in all directions.

In testimony whereof I affix my signature in presence of two witnesses.

ENOS A. WALL.

Witnesses:
 A. M. PARKINS,
 GEO. E. W. EVANS.

Copies of this patent may be obtained for five cents each, by addressing the "Commissioner of Patents, Washington, D. C."